(No Model.)
G. W. DORR.
BICYCLE TIRE.
No. 589,939. Patented Sept. 14, 1897.
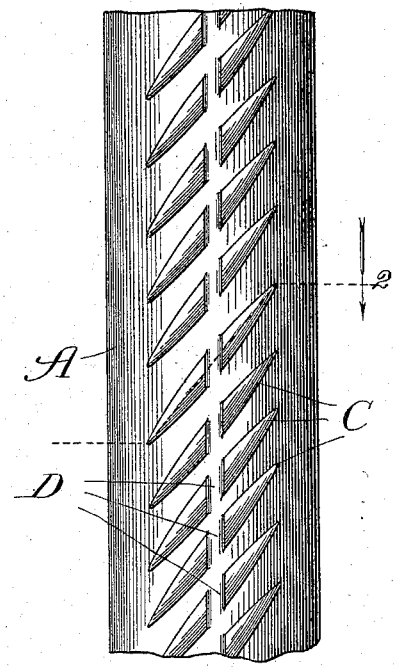
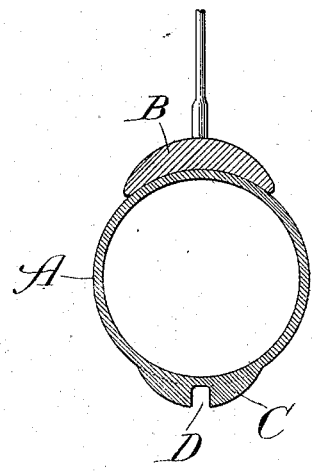
Witnesses:
Chas. E. Gaylord,
Lute J. Ritter
Inventor:
George W. Dorr,
By Banning & Banning & Sheridan
Attys.

UNITED STATES PATENT OFFICE.

GEORGE W. DORR, OF CHICAGO, ILLINOIS.

BICYCLE-TIRE.

SPECIFICATION forming part of Letters Patent No. 589,939, dated September 14, 1897.

Application filed March 22, 1897. Serial No. 628,559. (No model.)

*To all whom it may concern:*

Be it known that I, GEORGE W. DORR, a citizen of the United States, residing at Chicago, Illinois, have invented certain new and useful Improvements in Bicycle-Tires, of which the following is a specification.

The object of my invention is to make a tire for bicycles and other wheeled vehicles in which the adhesive tendency between the periphery of the tire and the surface over which it is moving will be reduced to a minimum; and my invention consists in the features and details of construction hereinafter described and claimed.

In the drawings, Figure 1 is a plan view of the periphery of a bicycle-tire provided with my improvements, and Fig. 2 a transverse section taken in line 2 of Fig. 1.

In making my improved tire A for the wheels of bicycles and other vehicles I make it of the usual material and attach it to the wheel-rim B in the usual way, and the usual means for inflating it may also be employed.

I provide the outer surface or periphery of the tire with a series of lugs, ridges, or projections C, which may be molded out of the material of which the tire is composed or otherwise made and afterward secured in place, although I prefer to make them as an integral portion of the tire. These lugs, ridges, or projections extend out a desired distance from the periphery of the tire and form the contact-surface between the tire and the ground. I prefer to arrange these lugs at an angle of about forty-five degrees to the longitudinal center of the tire, as shown, although they may be arranged at any angle that may be preferred, even though transversely to the longitudinal center of the tire. I consider, however, that there is an advantage in having the lugs, ridges, or projections arranged at the angles shown, as a part of one lug will be coming into contact with the ground as a part of another is leaving, thus insuring an even movement to the wheel, while if they are arranged strictly transversely to the tire each lug or ridge will strike and leave the ground again as an individual part, thus tending to cause a slightly jolting or uneven movement in the wheel.

The lugs, ridges, or projections are arranged at a desired distance apart, so that there will be uninterrupted air-spaces between them transversely across the tire. Furthermore, I provide a longitudinal circumferential channel or groove D, which may be U-shaped, as shown, or any other shapes. It serves to divide the lugs or ridges along the longitudinal center of the tire, so that air may circulate not only between the lugs or ridges, but also through them longitudinally. This will have the effect of diminishing the adhesion or friction between the lugs and ridges and the surface over which the tire is moving and minimize it to the greatest practical extent. It also prevents the formation of a vacuum between the surface of the tire and the surface over which it is moving, which causes an adhesion of the two. The advantage of securing this result is obvious, inasmuch as it requires less force to propel the wheel and permits an acceleration of speed with a given amount of force.

I claim—

1. A tire for bicycle or other wheels provided with lugs, ridges or projections around its external periphery divided by a longitudinal circumferential groove.

2. A tire for bicycle or other wheels provided with lugs, ridges or projections around its external periphery divided by a longitudinal circumferential groove, and arranged at an angle which presents a portion of the lug, ridge or projection first to the ground, whereby a part of one is coming into contact as a part of another is passing out of contact with the ground.

3. A tire for bicycle or other wheels provided with lugs, ridges or projections around its external periphery having uninterrupted air-passages between them.

GEORGE W. DORR.

Witnesses:
EPHRAIM BANNING,
THOMAS A. BANNING.